US008062089B2

(12) United States Patent
Hardin et al.

(10) Patent No.: US 8,062,089 B2
(45) Date of Patent: Nov. 22, 2011

(54) ELECTRONIC PLAYSET

(75) Inventors: Mark Hardin, Hermosa Beach, CA (US); Dominic Ambriz, Playa Del Ray, CA (US); Erich Weidetz, Santa Monica, CA (US); Tracy Thurman, Torrance, CA (US); Eric Skifstrom, Manhattan Beach, CA (US); Ken Metzler, Fallbrook, CA (US); Martin Ly, San Jose, CA (US); Jack Millerick, San Jose, CA (US)

(73) Assignee: Mattel, Inc., El Segundo, CA (US)

( * ) Notice: Subject to any disclaimer, the term of this patent is extended or adjusted under 35 U.S.C. 154(b) by 1054 days.

(21) Appl. No.: 11/866,373

(22) Filed: Oct. 2, 2007

(65) Prior Publication Data

US 2008/0139265 A1   Jun. 12, 2008

Related U.S. Application Data

(60) Provisional application No. 60/849,264, filed on Oct. 2, 2006.

(51) Int. Cl.
*A63H 29/22* (2006.01)

(52) U.S. Cl. .................................. 446/175; 446/484

(58) Field of Classification Search .............. 446/72–84, 446/71, 175, 484; 345/204–206; 463/30; 273/142 R
See application file for complete search history.

(56) References Cited

U.S. PATENT DOCUMENTS

| | | | |
|---|---|---|---|
| 3,182,420 A | 5/1965 | Bender | |
| 4,398,723 A | 8/1983 | Erickson et al. | |
| 4,421,317 A | 12/1983 | Hector et al. | |
| 4,432,151 A | 2/1984 | Morris | |
| 5,013,278 A | 5/1991 | Dixon et al. | |
| 5,085,609 A | 2/1992 | Haberle | |
| 5,278,779 A | 1/1994 | Conway et al. | |
| 5,312,284 A | 5/1994 | Grober et al. | |
| 5,445,552 A | 8/1995 | Hine | |
| 5,513,129 A | 4/1996 | Bolas et al. | |
| 5,655,945 A | 8/1997 | Jani | |
| 5,728,962 A | 3/1998 | Goede | |
| RE35,819 E | 6/1998 | Suzuki | |
| 5,766,077 A | 6/1998 | Hongo | |
| 5,952,598 A | 9/1999 | Goede | |

(Continued)

FOREIGN PATENT DOCUMENTS

EP   0978301   2/2000

(Continued)

*Primary Examiner* — Dmitry Suhol
*Assistant Examiner* — Alex F. R. P. Rada, II
(74) *Attorney, Agent, or Firm* — Kolisch Hartwell, PC

(57) ABSTRACT

A video toy is provided with a video screen and multiple selectable dioramas positioned behind the video screen. The dioramas may be fixed to a shaft so that rotation of a handle of the shaft moves a first diorama to a position behind the screen and visible through the screen. Rotating the handle and shaft again may sequentially move a second diorama to a position behind the screen replacing the first diorama. The video toy may display characters and objects on the screen that engage in activities and appear to interact with objects in the diorama visible through the video display. Virtual characters may be programmed to exhibit development and modify their activities and interactions with the player based on type and frequency of inputs. The video toy may respond to signals from a computer by accessing additional game play modes or options.

17 Claims, 11 Drawing Sheets

U.S. PATENT DOCUMENTS

| | | |
|---|---|---|
| 5,966,526 A | 10/1999 | Yokoi |
| 5,971,833 A | 10/1999 | Rasmussen |
| 6,039,625 A | 3/2000 | Wang |
| 6,048,251 A | 4/2000 | Klitsner |
| 6,056,618 A | 5/2000 | Larian |
| 6,165,068 A | 12/2000 | Sonoda |
| 6,190,174 B1 | 2/2001 | Lam |
| 6,192,215 B1 | 2/2001 | Wang |
| 6,213,871 B1 | 4/2001 | Yokoi |
| 6,227,931 B1 | 5/2001 | Shackelford |
| 6,227,966 B1 | 5/2001 | Yokoi |
| 6,273,815 B1 | 8/2001 | Stuckman et al. |
| 6,290,565 B1 | 9/2001 | Galyean et al. |
| 6,302,612 B1 | 10/2001 | Fowler et al. |
| 6,319,010 B1 | 11/2001 | Kikinis |
| 6,319,130 B1 | 11/2001 | Ooseki et al. |
| 6,343,006 B1 | 1/2002 | Moscovitch et al. |
| 6,353,170 B1 | 3/2002 | Eyzaguirre et al. |
| 6,369,822 B1 | 4/2002 | Peevers et al. |
| 6,449,518 B1 | 9/2002 | Yokoo et al. |
| 6,461,238 B1 | 10/2002 | Rehkemper |
| 6,500,070 B1 | 12/2002 | Tomizawa et al. |
| 6,537,149 B2 | 3/2003 | Sogabe |
| 6,542,869 B1 | 4/2003 | Foote |
| 6,558,225 B1 | 5/2003 | Rehkemper et al. |
| 6,609,968 B1 | 8/2003 | Okada et al. |
| 6,652,383 B1 | 11/2003 | Sonoda |
| 6,656,049 B1 | 12/2003 | Masaki |
| 6,722,973 B2 | 4/2004 | Akaishi |
| 6,773,325 B1 | 8/2004 | Mawle et al. |
| 6,800,013 B2 | 10/2004 | Liu |
| 6,814,662 B2 | 11/2004 | Sasaki et al. |
| 6,832,955 B2 | 12/2004 | Yokoi |
| 6,885,898 B1 | 4/2005 | Brown et al. |
| 6,898,759 B1 | 5/2005 | Terada et al. |
| 6,937,152 B2 | 8/2005 | Small |
| 6,988,896 B2 | 1/2006 | Cho |
| 6,997,773 B1 | 2/2006 | Dubois et al. |
| 7,001,270 B2 | 2/2006 | Taub |
| 7,024,255 B1 | 4/2006 | Brown et al. |
| 7,059,934 B2 | 6/2006 | Whitehead |
| 7,081,033 B1 | 7/2006 | Mawle et al. |
| 7,104,884 B2 | 9/2006 | Yokoi |
| 7,203,558 B2 | 4/2007 | Sugiyama et al. |
| 7,254,455 B2 | 8/2007 | Moulios |
| 2002/0132553 A1 | 9/2002 | Jelinek |
| 2003/0064685 A1 | 4/2003 | Kim |
| 2003/0124954 A1 | 7/2003 | Liu |
| 2003/0216160 A1 | 11/2003 | Yokoi |
| 2004/0004667 A1 | 1/2004 | Morikawa |
| 2004/0133354 A1 | 7/2004 | Low et al. |
| 2004/0166936 A1* | 8/2004 | Rothschild et al. ............ 463/35 |
| 2004/0166937 A1* | 8/2004 | Rothschild et al. ............ 463/36 |
| 2004/0259635 A1 | 12/2004 | Germeraad |
| 2005/0009443 A1 | 1/2005 | Martin |
| 2005/0024313 A1 | 2/2005 | Nakajima et al. |
| 2005/0054440 A1 | 3/2005 | Anderson |
| 2005/0119037 A1 | 6/2005 | Yokoi |
| 2005/0192084 A1* | 9/2005 | Iwamoto ........................ 463/20 |
| 2005/0237701 A1 | 10/2005 | Yu |
| 2005/0245302 A1 | 11/2005 | Bathiche |
| 2005/0253775 A1 | 11/2005 | Stewart |
| 2006/0007644 A1 | 1/2006 | Huilgol |
| 2006/0009121 A1 | 1/2006 | Rotundo |
| 2006/0058101 A1 | 3/2006 | Rigopulos |
| 2006/0077621 A1 | 4/2006 | Adatia |
| 2006/0082518 A1 | 4/2006 | Ram |
| 2006/0126284 A1 | 6/2006 | Moscovitch |
| 2006/0160588 A1 | 7/2006 | Yamada |
| 2006/0172787 A1 | 8/2006 | Ellis |
| 2006/0181537 A1 | 8/2006 | Vasan |
| 2006/0266200 A1 | 11/2006 | Goodwin |
| 2007/0247439 A1* | 10/2007 | Daniel et al. .................. 345/173 |

FOREIGN PATENT DOCUMENTS

| | | |
|---|---|---|
| EP | 1365386 | 11/2003 |
| GB | 2425730 | 11/2006 |
| JP | 64091188 | 4/1989 |
| JP | 1315791 | 12/1989 |
| JP | 63170697 | 1/1990 |
| JP | 2000037568 | 2/2000 |
| JP | 2006198017 | 8/2006 |
| WO | WO9422128 | 9/1994 |
| WO | WO9503588 | 2/1995 |
| WO | WO9525312 | 9/1995 |
| WO | WO0014719 | 3/2000 |
| WO | WO2006034180 | 3/2006 |

* cited by examiner

ELECTRONIC PLAYSET

CROSS-REFERENCE TO RELATED APPLICATION

This application claims priority under 35 U.S.C. 119(e) to U.S. Provisional Patent Application No. 60/849,264 entitled "Virtual Character Video Toy with Alternate Backgrounds," filed Oct. 2, 2006, the disclosure of which is incorporated herein by reference.

BACKGROUND

This invention relates to toys with video screens and more specifically relates to video screen toys with virtual characters that may respond to the player and may be presented in association with one or more selectable diorama backgrounds.

Examples of video screen toys are found in the following patents and published patent applications: U.S. Pat. No. 4,110,725, U.S. Pat. No. 4,432,151, U.S. Pat. No. 4,806,931, U.S. Pat. No. 5,209,695, U.S. Pat. No. 5,213,337, U.S. Pat. No. 5,764,763, U.S. Pat. No. 5,966,526, U.S. Pat. No. 5,971,833, U.S. Pat. No. 5,971,855, U.S. Pat. No. 6,022,273, U.S. Pat. No. 6,048,251, U.S. Pat. No. 6,056,618, U.S. Pat. No. 6,064,854, U.S. Pat. No. 6,165,068, U.S. Pat. No. 6,213,871, U.S. Pat. No. 6,227,966, U.S. Pat. No. 6,461,238, U.S. Pat. No. 6,500,070, U.S. Pat. No. 6,537,149, U.S. Pat. No. 6,652,383, U.S. Pat. No. 6,656,049, U.S. Pat. No. 6,832,955, U.S. Pat. No. 7,104,884, US20040133354, US20060009121, US20060160588, US20060172787, WO0158554 and JP2000037568. The disclosures of all the patent applications, patents and other publications recited in this application are incorporated herein by reference in their entirety for all purposes.

SUMMARY

An interactive video toy is provided that may have one or more characters presented on a video screen and may allow players to interact with the character by pressing buttons or providing other input. The toy may include multiple selectable scenes or dioramas that simulate locations, such as a bedroom and a living room, with features and appropriate objects such as beds and tables. Characters may be displayed on a transparent video screen disposed in front of the selected diorama. Characters may appear to interact with diorama objects such as by sitting on a chair.

The toy may resemble a house or other suitable environment and the screen may resemble a part of the environment, such as a large window in the house allowing the user to see inside. Each diorama may resemble a room of the house with fixtures and features consistent with the room represented. For example, the bedroom may have a bed and a dresser. The bathroom may have a tub and a sink. The toy may have additional features in front of the display screen that do not change with the diorama. Dioramas may have depth and may include three dimensional features and fixtures. Scenes representing other man-made or natural environments may be used In some examples, multiple dioramas may be fixed to a shaft forming an assembly similar to a multifaceted or multisided drum. The shaft and diorama assembly may be supported and contained by the toy housing. A floor of one diorama may form a back wall of an adjacent diorama.

A handle may be fixed to the shaft so that rotating the handle rotates the shaft and moves a first diorama to a position behind the screen. Rotating the shaft again may move a second diorama to a position behind the screen, and so on. Other dioramas may be completely obscured by the housing when not visible behind the screen. Dioramas may also be supported on display boards or a continuous flexible material that may be displayed selectively A virtual character displayed on the screen may respond to or interact with the diorama currently positioned behind the screen. With a first diorama, the character may appear to be in a living room and engage in activities associated with free time. Selecting and changing to a second kitchen diorama, the character may appear to pursue activities associated with cooking. When a bathroom diorama is behind the screen, the virtual character may wash their face at the sink. When the bedroom diorama is selected, the virtual character may lie down and go to sleep. Additional images may be generated on the screen in addition to the virtual character. For example, the virtual character may read a book in a living room or hold a pan in the kitchen.

For players to interact with the characters, control inputs may be provided. Control inputs such as buttons may be located on a front face of the toy. Each button may be associated with a different kind of input to allow different kinds of interaction with the characters. One button may be associated with food and eating. A button may be associated with socializing, and another button may be associated with chores. Control inputs may be on an element detachable from the housing as a remote input device.

Characters in the video toy may be programmed to develop new behaviors associated with the interactions and inputs provided by the player. The character may appear to develop habits or traits in response to repeated inputs. Lack of input from the player may evoke expressions of sadness, loneliness and/or truculence by the character. Extended lack of input may cause the character to appear to pack and move out of the video toy.

The toy may be configured to connect to and interact with other similar toys. Characters from one toy may be able to be displayed on another toy and interact with the character and may simulate visiting a friend.

The video toy may be associated with and respond to signals from a computer and the computer may be connected to the internet. The toy may include a signal processor and a microphone and may respond to acoustic signals generated by the computer. The toy may respond to the computer signals by providing access to additional games or additional characters on the screen.

The advantages of the present invention will be understood more readily after a consideration of the drawings and the Detailed Description of Preferred Embodiments.

DETAILED DESCRIPTION

Figure 1:
FIG. 1 is a perspective view showing a user playing with a video toy including a transparent screen displaying virtual characters with a diorama visible through the screen.

FIG. 1 is an illustrative example of video toy 10 with a user 12 holding the video toy and providing input to a virtual character. Video toy 10 may resemble a house with a picture window and viewable activities in the house. Video toy 10 may be sized to allow user 12 to hold the toy with two hands and operate controls on the front of the toy with thumbs. User 12 may be able to select the rooms viewed through the house picture window.

Figure 2:
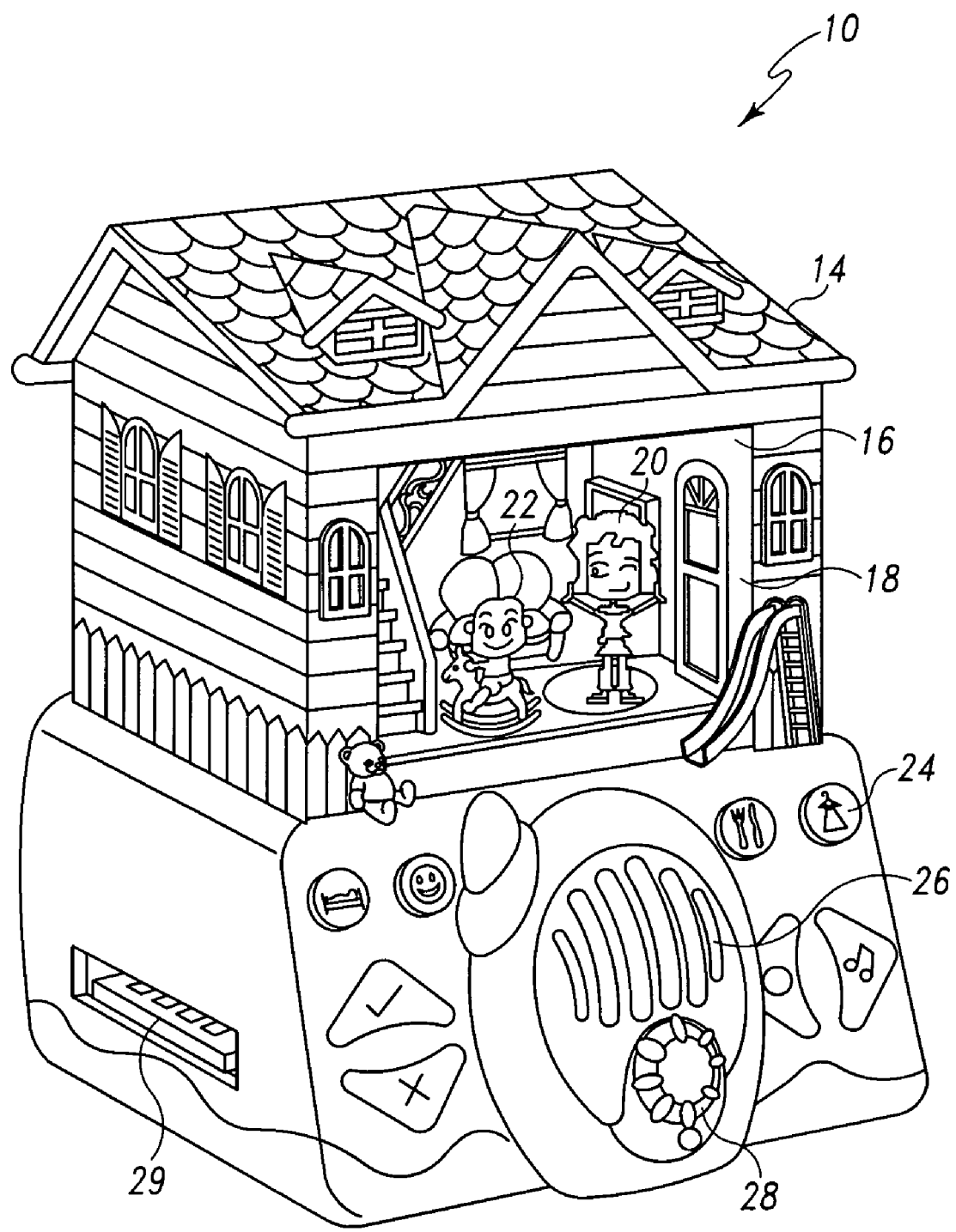
FIG. 2 is a perspective view of an example video toy including a housing, a transparent screen, a diorama visible through the screen, virtual characters displayed on the screen, control inputs, and a speaker.

FIG. 2 is a perspective view of the example video toy 10 of FIG. 1. Toy 10 includes a housing 14, a display 16, such as a transparent screen, and a diorama 18 visible through the screen. First virtual character or baby sitter 20 and second virtual character or infant 22 may be displayed on screen 16. Toy 10 is also shown to include one or more control inputs 24 and a toy speaker 26. Sound levels generated at speaker 26 may be controlled by a volume control 28. Toy 10 may connect to other video toys or devices at connector 29.

Video toy 10 may have a theme of baby sitting at a house and housing 14 may include additional features such as children's toys and play equipment visible as part of the housing decoration. Screen 16 may be configured to resemble a picture window in the side of the house allowing interior rooms and activities to be viewed from outside the house.

Virtual characters 20 and 22 may appear to be superimposed on the diorama visible through video screen 16. Characters may be programmed to engage in different activities depending on diorama 18 positioned behind video screen 16. Video screen 16 may generate images of additional objects as part of the actions of virtual characters 20 and 22. For example, video screen 16 may generate images of pots and pans used by virtual character 20 in a kitchen diorama 18. Video screen 16 may generate images of gym weights used by virtual character 20 in an exercise room diorama.

Figure 3:
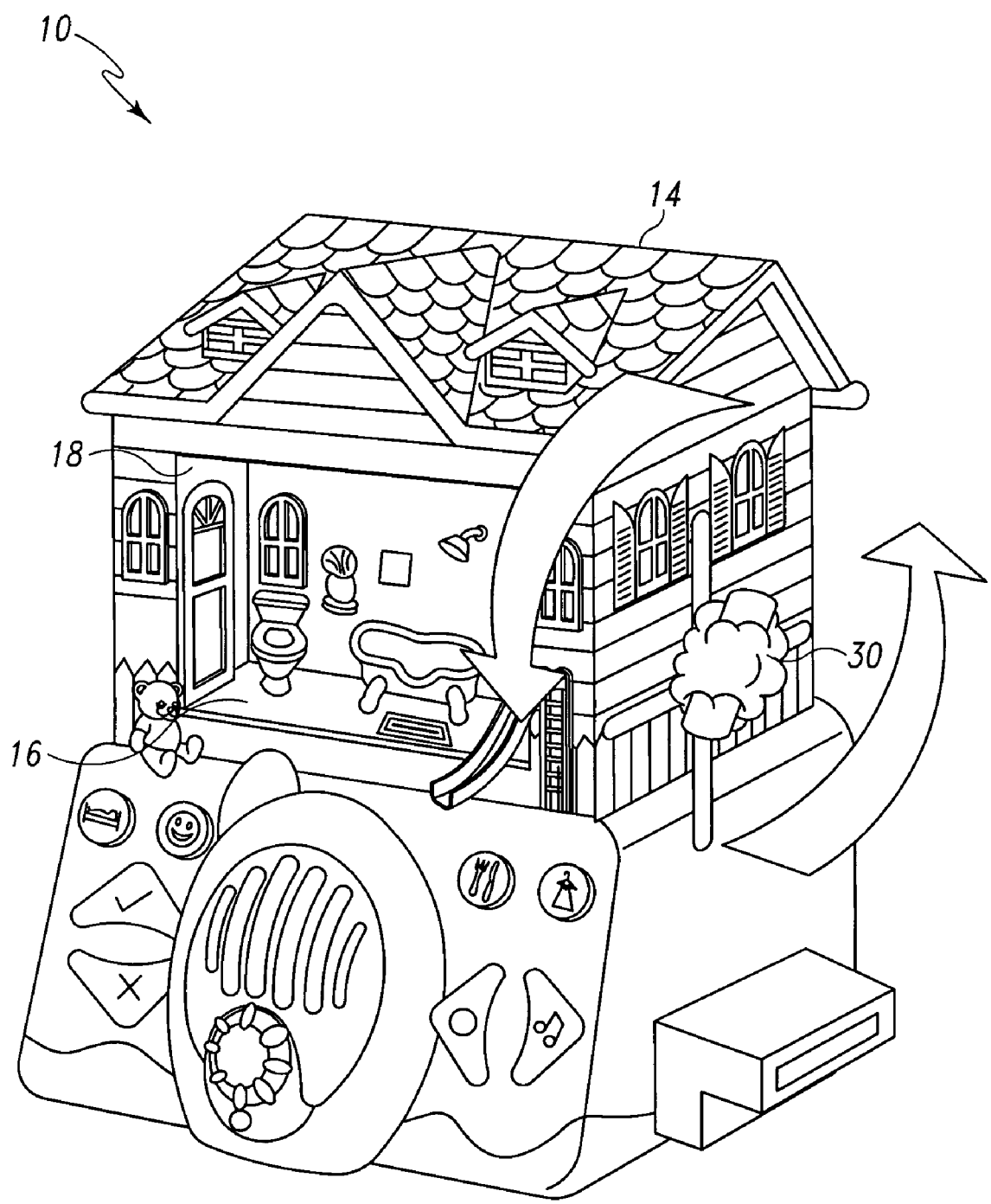
FIG. 3 is a perspective view of a video toy similar to FIG. 2 including a handle on a side of a toy for selecting the diorama positioned behind the screen.

FIG. 3 shows an example of a video toy 10 again including housing 14 and video screen 16 as well as handle 30. Handle 30 may be mounted to a shaft connected to several dioramas as illustrated below. Rotating the handle and shaft may select the diorama positioned behind screen 16. For clarity, similar numbering is used here and in later figures as are used in previous figures.

Figure 4:
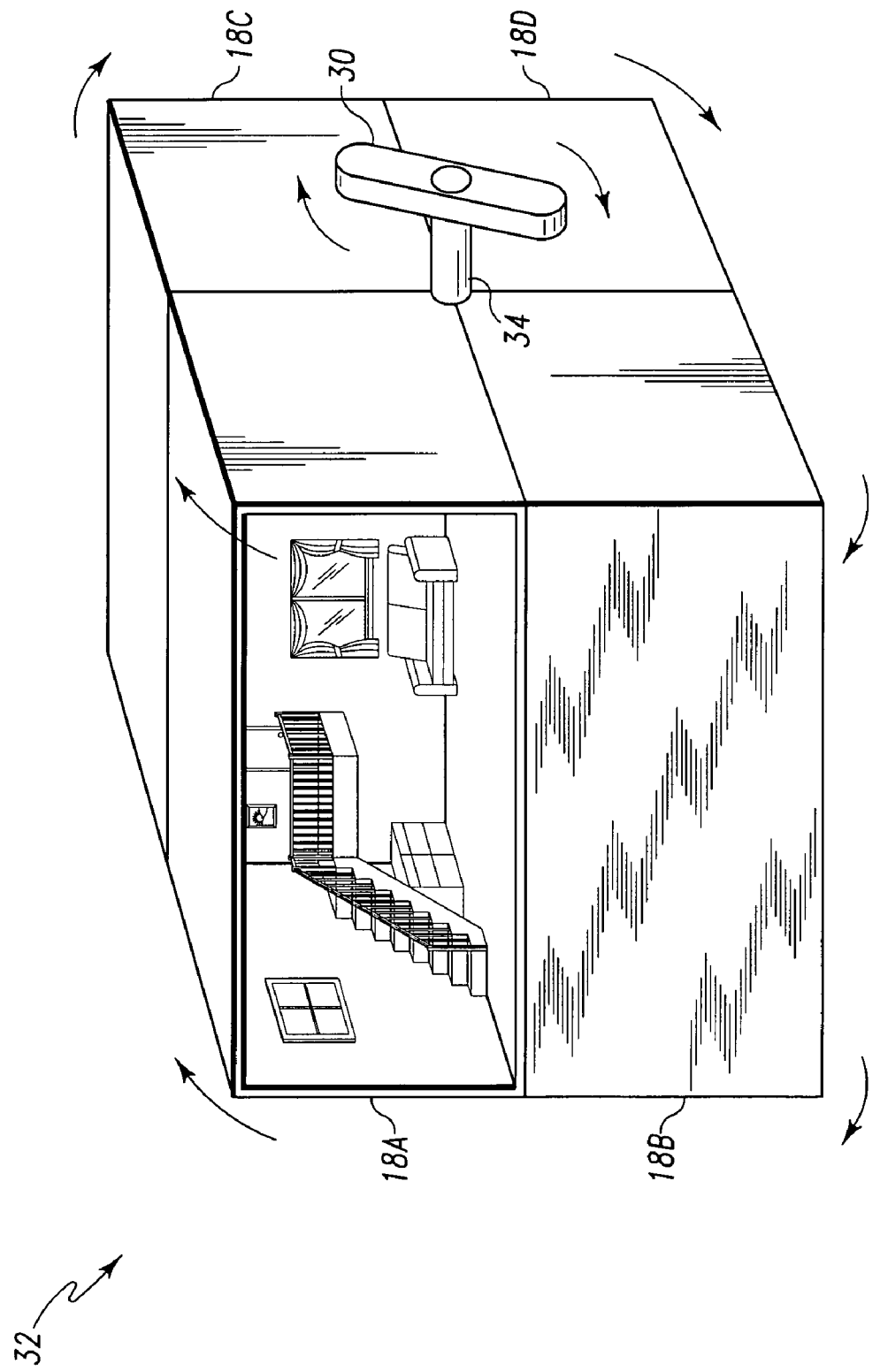
FIG. 4 is a perspective view of an example diorama assembly supported by the housing of the video toy showing four dioramas commonly connected to a shaft with a handle that rotates the diorama assembly.

FIG. 4 shows a diorama assembly 32 that includes four dioramas 18A, 18B, 18C and 18D. The floor of one diorama may also be the back wall of an adjacent diorama. All dioramas may be attached along an edge to a common shaft 34. The diorama viewed through screen 16 may be selected by turning handle 30 and shaft 34. Assembly 32 may rotate clockwise or counterclockwise. Diorama assembly 32 as illustrated is an example. Diorama assemblies may include more, fewer or differently configured dioramas of any appropriate scene. Dioramas may be two dimensional or three dimensional. Dioramas may include flat images and/or three dimensional objects.

Figure 5:
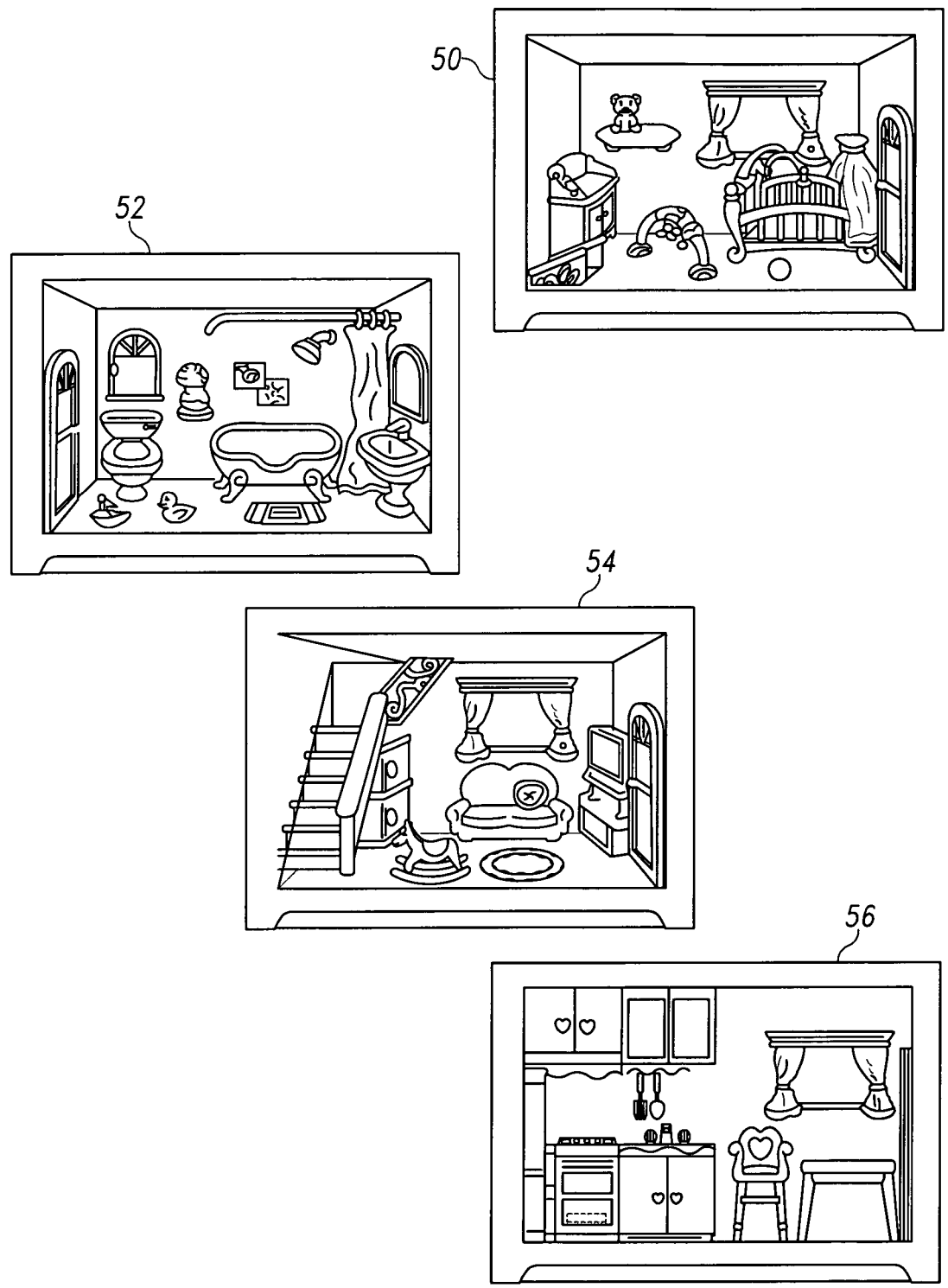
FIG. 5 is a front view of four examples of dioramas with features and fixtures including a bedroom, a bathroom, a living room and a kitchen.

FIG. 5 shows four examples of dioramas that may be included with video toy 10. Diorama 50 depicts a bedroom including a baby bed, a changing table, children's toys, a door and a window. Diorama 52 depicts a bathroom including a tub and shower, a toilet, a sink, a mirror, a door, a window and children's toys. Diorama 54 depicts a living room including a sofa, a bookshelf, a television, stairs, a door, a window and children's toys. Diorama 56 depicts a kitchen including a table, a chair, cabinets, a stove, utensils, a refrigerator, and a window. Diorama features may be two dimensional or three dimensional. The dioramas illustrated here are examples. Other diorama configurations may be used and still fall within the scope of this disclosure.

Toy 10 may be configured so virtual characters appear to respond to the specific diorama positioned behind screen 16. Virtual characters may appear to interact with features of diorama 18. Baby sitter 20 may appear to cook when kitchen diorama 56 is positioned behind screen 16. Screen 16 may display additional features such as pots and pans held by sitter 20. Sitter 20 may give infant 22 a bath when bathroom 52 is positioned behind screen 16. Screen 16 may display a towel and soap used by sitter 20.

Virtual characters may also be programmed to respond to input from user 12 at control inputs 24. Toy 10 may be programmed to present problems and issues that require user input to be resolved. For example, infant 22 may begin crying and demanding attention. Sitter 20 may solicit user input to select what care infant 22 requires. Using control inputs 24, user 12 may be able to select from different displayed options to select a care option 62 for infant 22.

Figure 6:
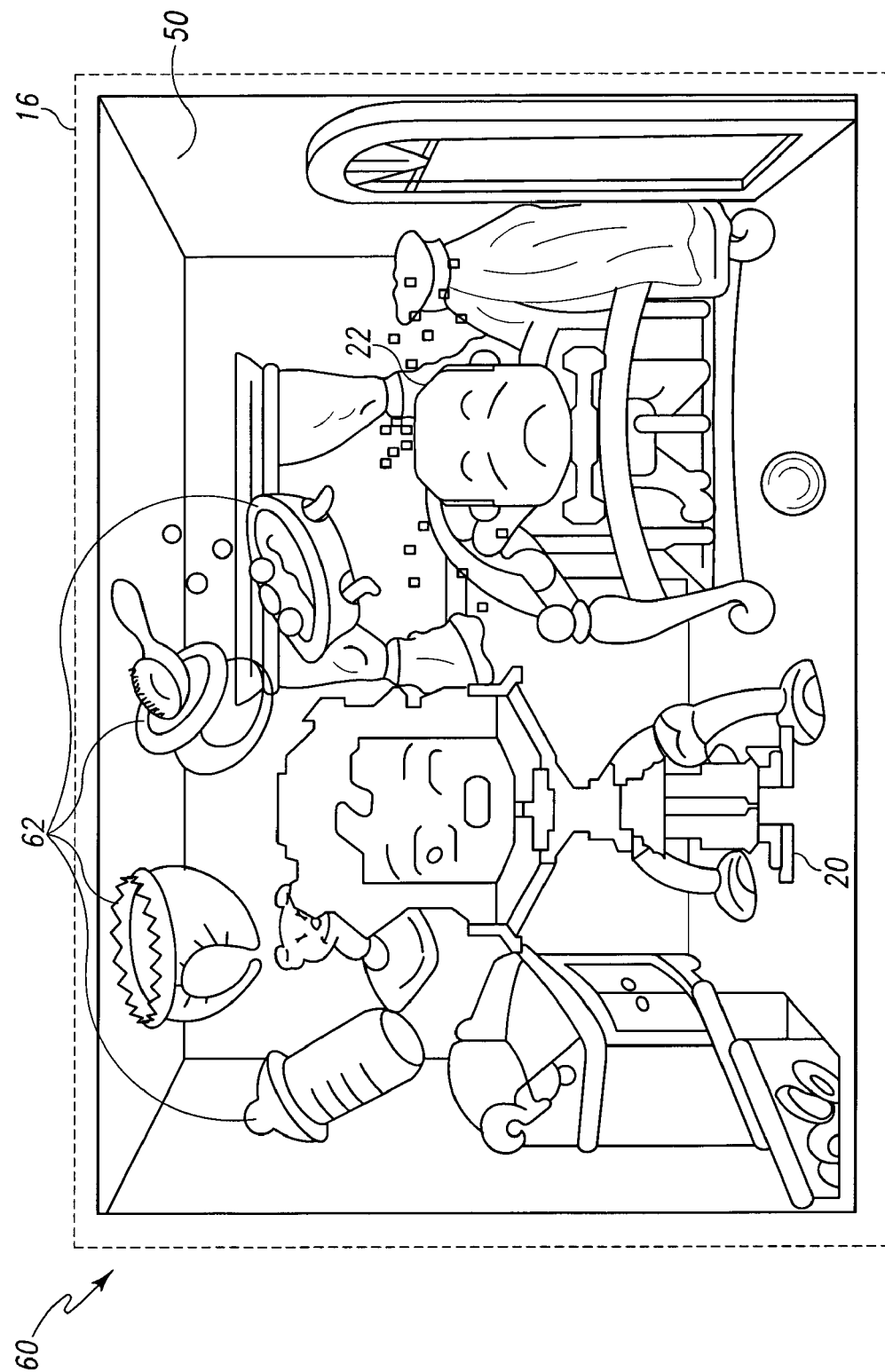
FIG. 6 is a front view of a bedroom diorama visible behind a transparent screen, the screen displaying a virtual character baby sitter and a virtual character infant and four options for infant care.

FIG. 6 is an example view 60 of transparent screen 16 with bedroom diorama 50 positioned behind the screen. Infant 22 is displayed on screen 16 as if in a crib of the diorama and crying. Screen 16 also displays sitter 20 with several care options 62 infant 22 may require. Care options 62 may include a bottle, a diaper, a toy and a bath.

User 12 may select one of displayed options 62 to meet the baby's needs and stop infant 22 from crying. The selected option may not meet the care needs of infant 22 and the infant may continue to cry. User 12 may select additional care options 62 in an effort to meet the needs of infant 22. User 12 may select options using control inputs 24.

As another example of problems or issues, if left unattended, infant 22 may appear to hide from sitter 20. Infant 22 may disappear from diorama 18 when sitter 20 is not paying adequate attention. Infant 22 may make known that it is hiding by making noises. Sitter 20 may be required to look for infant 22 in response to inputs from user 12 at control inputs 24.

As part of game play, toy 10 may prompt user 12 to select a new room or diorama. Toy 10 may have lights which illuminate or speaker 26 may generate sounds that encourage the user to select another scene or a specific scene.

Control inputs 24 may be buttons, joysticks, switches or other appropriate inputs for player interaction. Each control input 24 may be associated with a type of activity. Types of activities associated with inputs may include chores, eating, socializing or selecting objects on video screen 16. Pressing one button such as a chore button may evoke an appropriate reaction from virtual character 20 such as saying no and putting hands on hips. Pressing control input 24 more frequently may evoke different responses from virtual character 20.

Virtual character 20 may be programmed to develop new character traits based on repeated inputs by the player. Virtual character 20 may simulate personal development based on personal interactions with the player. Periods with no input by the player may result in virtual character 20 displaying boredom or petulance. Long periods with no input may cause virtual character 20 to simulate packing up and moving out of video toy 10.

Video toy 10 may be configured to interact with other video games. Video toy 10 may connect with other video games to display a second character 20 from the other video toy. Characters from other video toys may be displayed on video screen 16 and interact with character 20. Displayed characters from other toys may simulate a visiting friend.

Video characters and/or user 12 may play a game on video toy 10. The game may be played while the infant is asleep and making noise during the game may wake infant 22. Baby sitter 20 and infant 22 may engage in games as part of care.

Virtual characters displayed by toy 10 may include parents that supply rules and guidelines for baby sitter 20 as part of care for infant 22. Rewards may be given to sitter 20 for care that meets the parent's rules and guidelines. Rewards may be in the form of virtual cash that gives access to additional features or games as part of game play.

Figure 7:
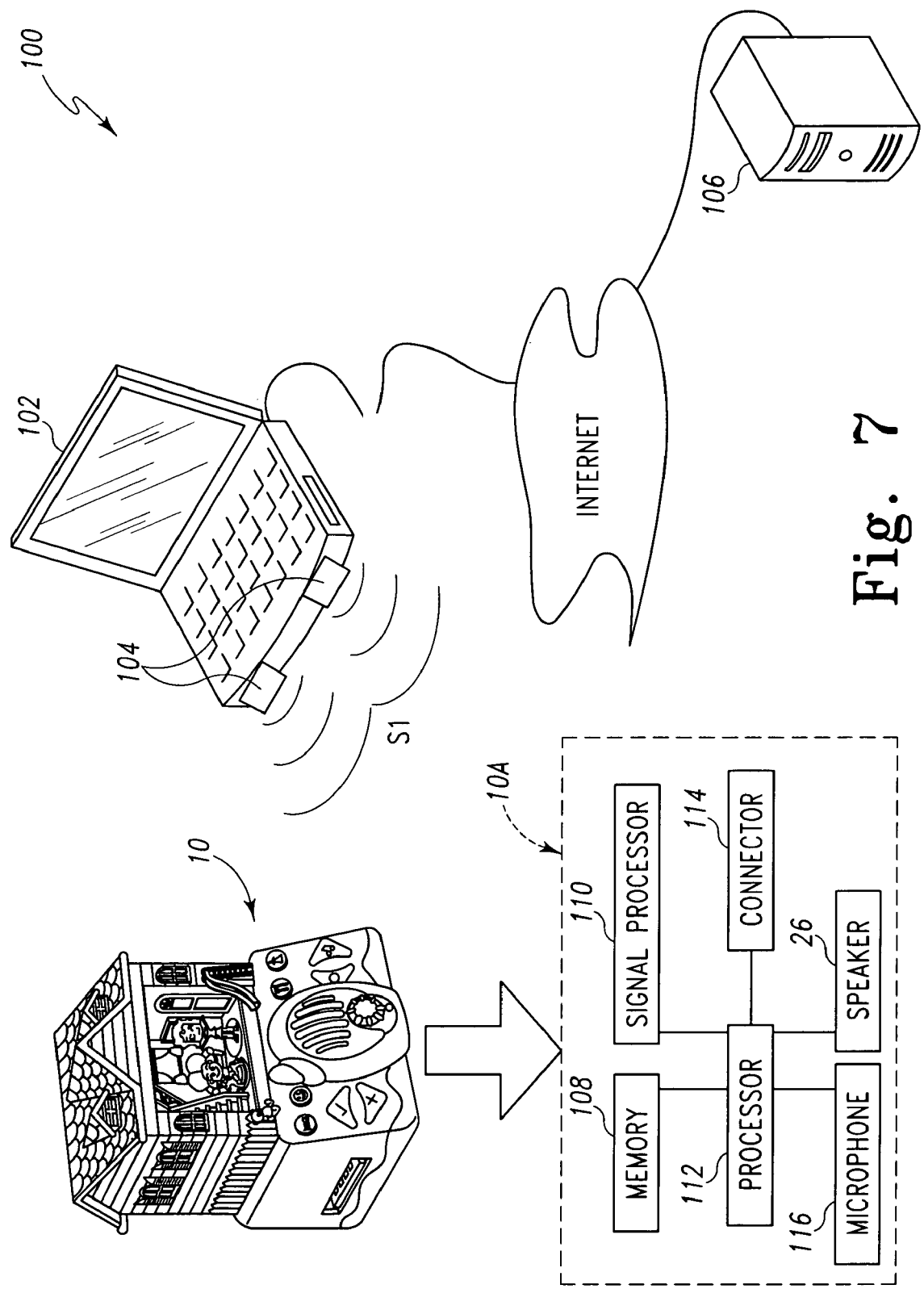
FIG. 7 is a diagram of the video toy including a processor, memory, a signal processing circuit, a microphone, a speaker and a connector with the video toy receiving an acoustic signal from a computer connected to a server over the internet.

Video toy 10 may be associated with a computer and may respond to signals from the computer. FIG. 7 shows video toy 10, electronic circuitry 10A of toy 10, computer 102 with speakers 104 and server 106. Video toy 10 may include toy speaker 26, memory 108, a signal processor circuit 110, a processor 112, a connector 114 and microphone 116. Processor 112 may be operably connected to speaker 26, memory 108, signal processor circuit 110, connector 114 and microphone 116.

Computer 102 may connect to server 106 over the internet. Server 106 and/or computer 102 may include software associated with video toy 10. Toy software at server 106 or computer 102 may generate electrical signals. The electrical signals may be converted to acoustic signals S1 at computer speaker 104. The acoustic signals may be received at microphone 116 and converted to an electrical signal at circuit 110. Toy 10 may recognize and respond to the signals from server 106. The signal may be of a specific frequency or duration to distinguish it from other background signals. Responding to the audio signal received at microphone 116 may include storing a game in memory 108 or providing access to a game, application or other file previously stored in toy memory.

Similarly, video toy 10 may respond to a signal from another source. Toy 10 may respond to signals from a landline telephone or a cell phone. User 12 may dial a number associated with toy 10. The user may hold the phone up to toy microphone 116 and a source at the dialed number may generate an audio signal. Toy 10 may respond to the audio or acoustic signal received over the phone.

Figure 8:
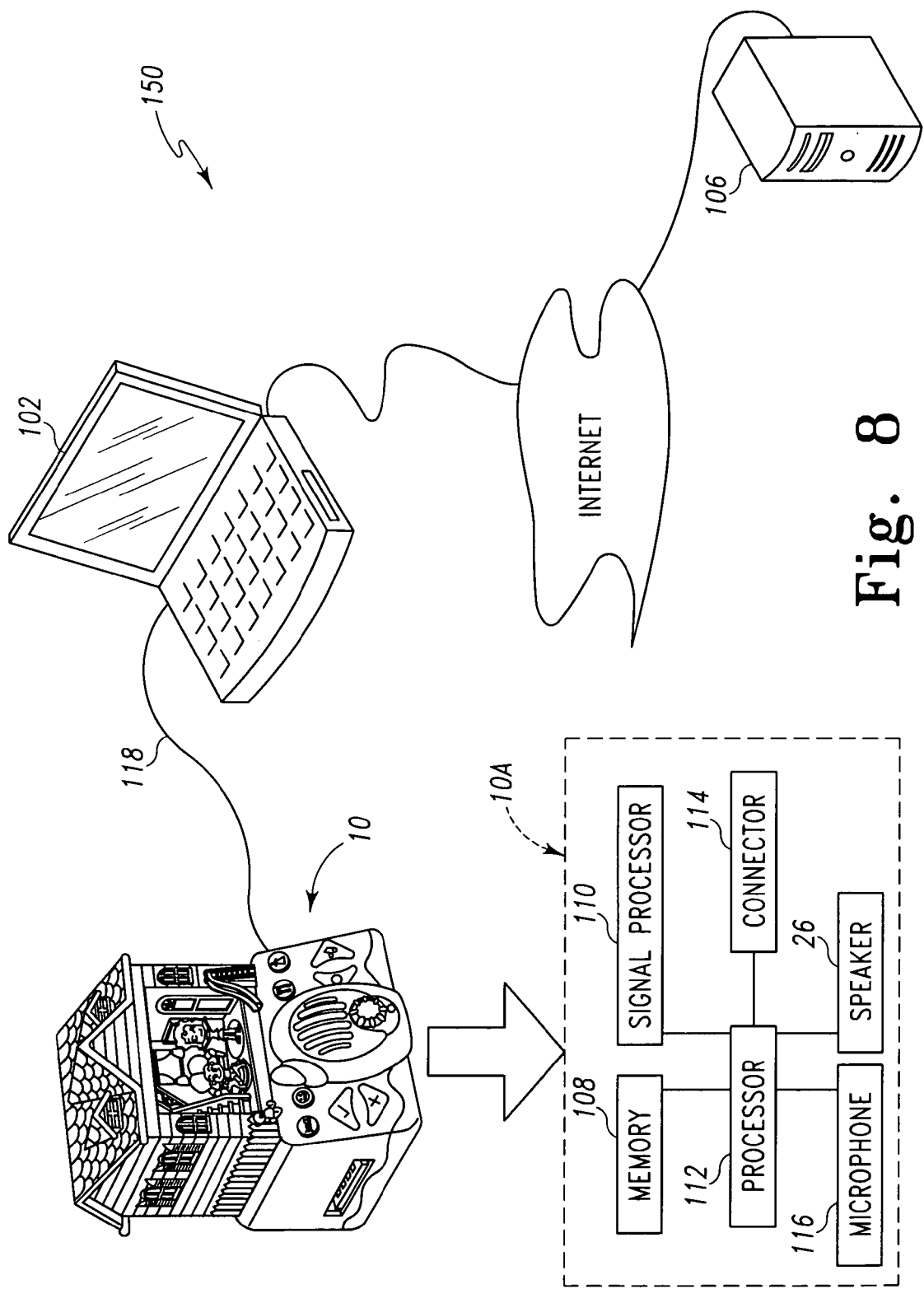
FIG. 8 is a diagram of the video toy connected to a computer and a server over the internet, the video toy including a processor, memory, a signal processing circuit, a microphone, a speaker and a connector.

Video toy 10 may instead connect to a computer using a cable. FIG. 8 is a component diagram 150 showing video toy 10, electronic circuitry 10A of toy 10, computer 102, server 106 and cable 118. Video toy 10 may include speaker 26, memory 108, a signal processor circuit 110, a processor 112 and a connector 114. Processor 112 may be operably connected to memory 108, signal processor circuit 110 and connector 114. Cable 118 may connect toy 10 to computer 102 or other networked processor based equipment. Computer 102 may connect to server 106 over the internet. Server 106 may include software associated with video toy 10. Toy software at server 106 may generate electrical signals that are received at toy 10. Signal processor circuit 110 may recognize and respond to the specific signals from server 106.

Responding to the signal received through connector 114 and cable 118 may include storing audio files in memory 108 that may be used to generate sounds at speaker 26. Responding to the signal may include storing a game in memory 108 or providing access to a game, application or file previously stored in toy memory. Responding to the signal may include transferring software and applications from the server to toy 10.

Computer 102 as used in this disclosure includes laptop computers, personal data assistants, telephones or other processor based electronics. Connector 29 may include a plurality of connectors for accessing multiple video toys. Cable 118 may be a USB cable, an audio cable with terminations commonly referred to as RCA connectors or other signal conducting cable with compatible plugs between computer 102 and toy 10.

Referring again to FIG. 1, connector 29 may be used to connect to other video toys. Connector 29 may comprise two connector positions and may provide for connection to two other video toys. Connector 29 may include a plurality of connectors for accessing a plurality of video toys.

Figure 9:
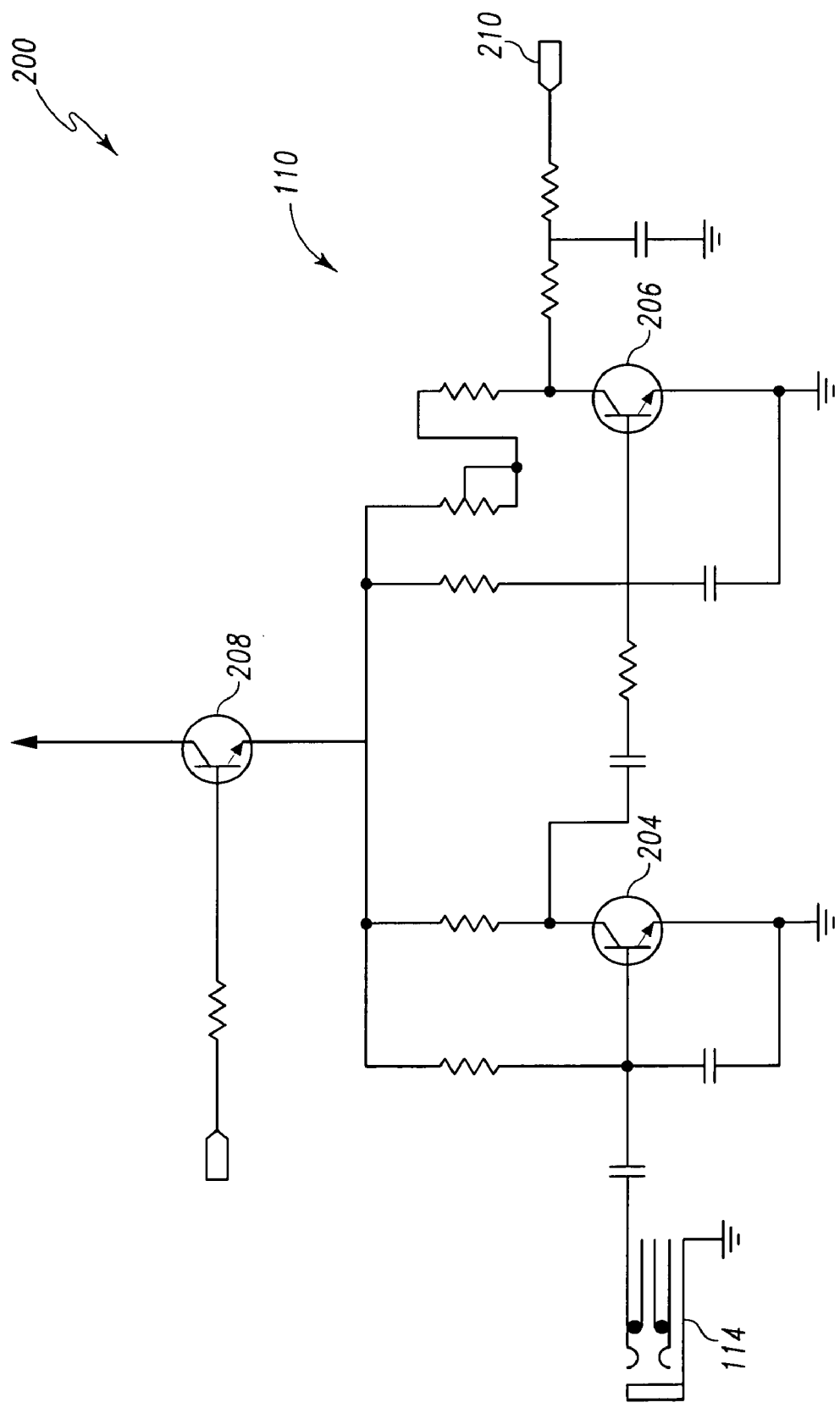
FIG. 9 is a circuit diagram of an example signal processor showing a frequency recognition circuit.

FIG. 9 is a circuit diagram 200 of signal processor circuit 110 implemented with an exemplary frequency recognition circuit. Circuit 110 may include connector 114, a first and a second frequency recognition circuit transistor 206 and 204, supporting passive components including resistors and capacitors and a transistor 208 associated with voltage regulation.

Connector 114 may receive a cable for transferring a signal from computer 102 as in FIG. 8. Connector 114 may be implemented as microphone 116 to receive an acoustic or sonic signal from computer speakers 104 as in FIG. 7. Circuit 110 may differentiate or detect a specific received signal or frequency and output an indication of the received signal to processor 112 or other component. Video toy 10 may respond to the output indication of circuit 110 as illustrated above.

Figure 10:
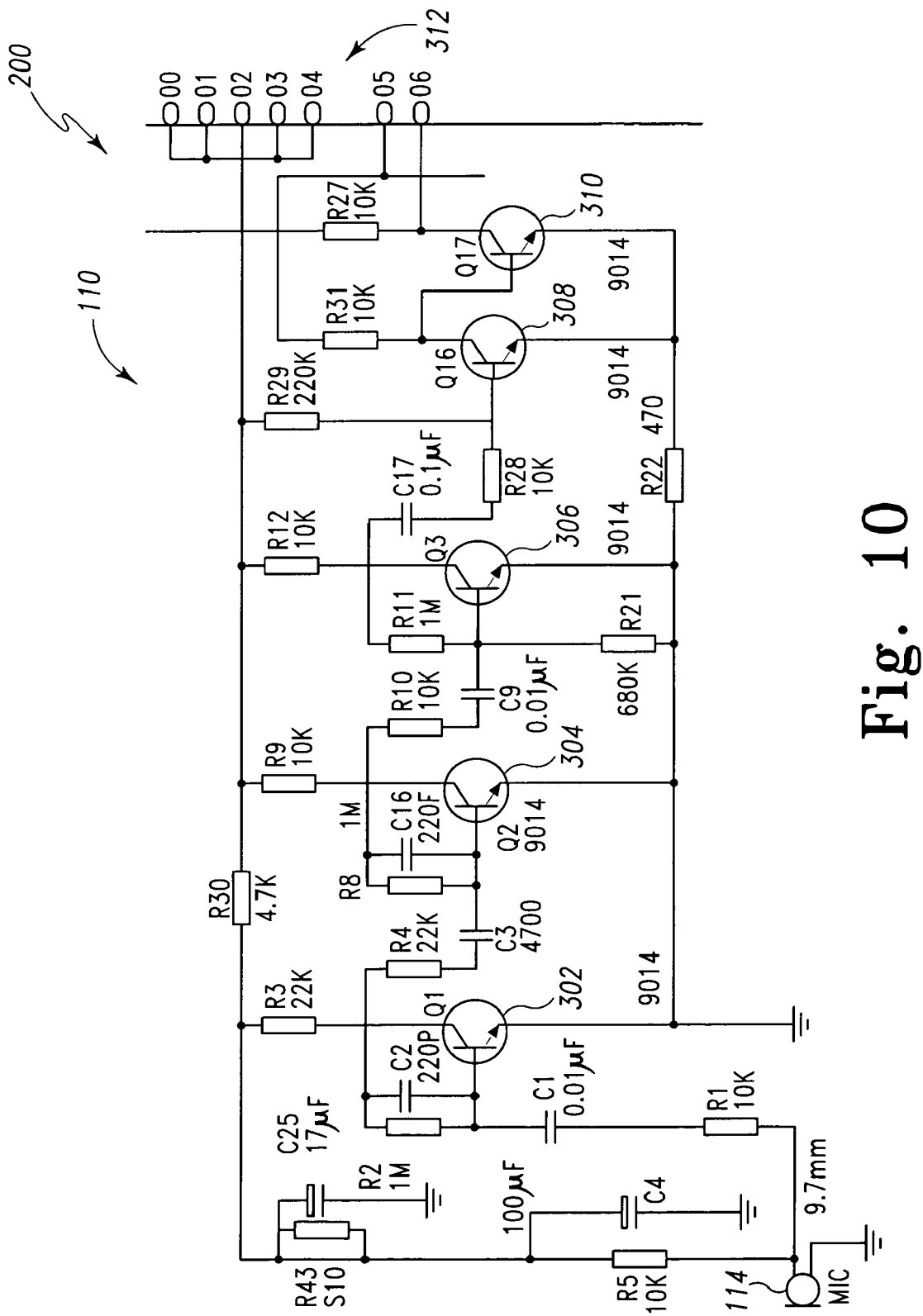
FIG. 10 is a circuit diagram of another example signal processor showing a frequency recognition circuit.

FIG. 10 is a circuit diagram 300 of an exemplary signal processor circuit 110 configured as a frequency recognition circuit. Circuit 110 is shown here including microphone 114, resonant circuit transistors 302 and 304, amplifier transistors 306, 308 and 310 and output termination 312. Termination 312 may include LED lights, connectors or connections to toy circuit components such as processor 112. Circuit 110 may differentiate or detect a specific signal from computer 102 such as an acoustic or sonic tone or frequency or more specifically a dual tone multi frequency (DTMF) signal. Circuit 110 may output an indication of the received signal at termination 310 to processor 112 or other component. As described above, video toy 10 may respond to the output indication of circuit 110.

Both circuits 200 and 300 may be modified by one skilled in the art to send a signal from computer 102 to toy 10 with acoustic signals and a microphone, electrical signals through a cable or through a wireless connection such as defined by IEEE 802.x. The circuits shown are examples and should not be construed as limitations.

Figure 11:
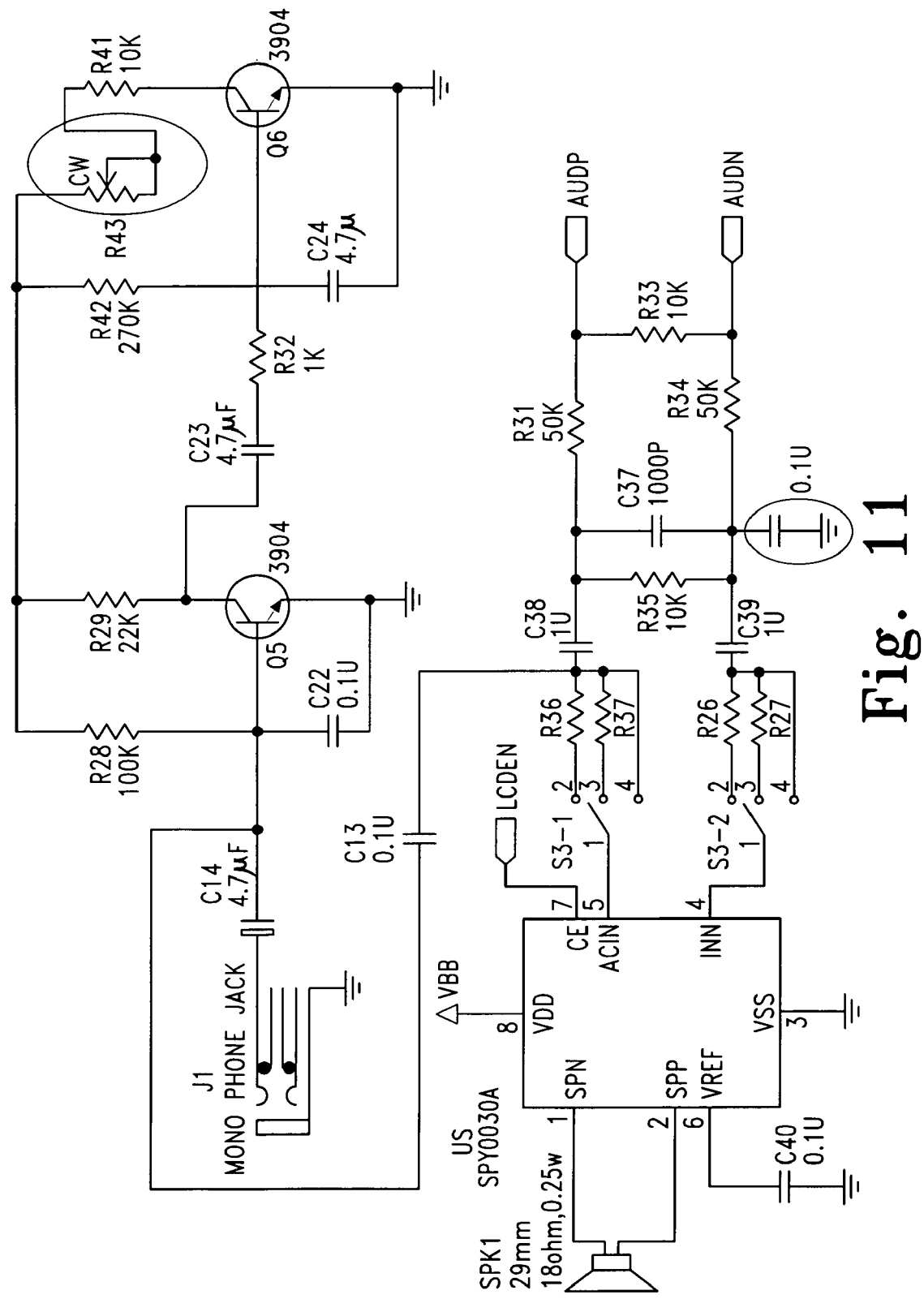
FIG. 11 is a circuit diagram of another example showing a beat recognition circuit.

FIG. 11 is a circuit diagram 300 of an exemplary beat recognition processor circuit 110 configured as a frequency recognition circuit.

The following listing describes one example of an electronic playset in accordance with the present disclosure:

Plastics

Toy may include:

Housing front and back

Base front and back

Clear ABS LCD screen protector

2 Kraton gaskets to hold LCD 4 different rooms/backgrounds

Turn knob to change room orientation

Roof

Small volume control knob

Volume control knob link

Furniture for kitchen, living room, bedroom, and bathroom 1 small door/room (total of 4)

Speaker housing

Battery door and compartment

PVC plug for female connection port

Electronics

Toy may include:

160×80 Negative FSTN LCD screen

External ROM (2 MB)

2 Nichia white LED's

1 Red LED 27 mm speaker 2 tact switches for 4 room recognition 3 throw switch for volume control Contacts to denote "try-me" mode Reset switch 6 buttons 4 AAA batteries and contacts Contacts for connecting units (same as House)

Function

Room Change Function:

Toy may have 4 different rooms that consist of a back wall and floor and may be aligned in the shape of a plus sign (+) from the side view The back wall of the current room creates the floor of the room behind it Each room may have a door attached on the right hand side of the edge of the floor so that each door rotates with each room Rooms may be rotated when the knob on the exterior of the main housing is rotated Rooms may be able to rotate both clock wise and counter clock wise Knob/mechanism may have a slight index so that the knob slightly snaps into place after 90 deg of rotation LEDs may remain on as each room is rotated Volume Knob Function:

Volume may have 3 settings using a 3 throw switch: Low, Medium, High

The volume knob may have 3 available positions: Left bottom (0 deg), Top (90 deg), Right bottom (180 deg)

In some embodiments, volume knob may not be able to be set to any position between or beyond the above 3 positions Volume may be low at 0 deg, Medium at 90 deg, and High at 180 deg Volume knob may control a link that shifts the 3 throw switch left to right as it is rotated from 0 to 180 deg The following paragraphs described various embodiments of the present disclosure.

An electronic game may comprise: a housing including a display; a movable portion having a plurality of dioramas and mounted to the housing, the movable portion configured to move relative to the display; and a switch configured to alter game play in response to alignment of the plurality of dioramas relative to the display.

A selected diorama may be visible when the selected diorama is aligned with the display.

The embodiments described above may further comprise a plurality of user inputs configured to provide access to game features associated with the selected diorama.

The display of the above embodiments may be a transparent screen mounted adjacent one or more light sources.

Another embodiment includes an electronic toy comprising: a housing including a transparent screen; a rotatable portion mounted to the housing and having a first representation of an environment and a second representation of an environment, the rotatable portion configured to rotate relative to the screen to align one of the first and second representations with the screen; and a light mounted adjacent the screen and configured to illuminate the screen in response to alignment of one of the first and second representations with the screen.

Regarding the embodiment described in the paragraph immediately above, the first and second representations may be coupled to a shaft having an axis of rotation substantially parallel to a longitudinal axis of the screen.

Another embodiment includes an electronic playset comprising: a housing having a hollow interior; a see-through monitor disposed on the housing; a drum disposed in the hollow interior of the housing and including a first region and a second region, the drum being rotatable between a first alignment and a second alignment, wherein the first region is visible through the see-through monitor when the drum is in the first alignment and the second region is visible through the see-through monitor when the drum is in the second alignment, and a transparent screen disposed on the see-through monitor and configured to display an animated image superimposed over the first region when the drum is in the first alignment and to display an animated image superimposed over the second region when the drum is in the second alignment.

Another embodiment includes the embodiment of the immediately proceeding paragraph further comprising a base for supporting the housing on a surface. In yet other embodiments, the drum may be rotatable about an axis that is substantially parallel to a plane defined by the base when the housing is supported on a surface.

One of the first and second regions described above may be a diorama with a three-dimensional object, and the transparent screen may be further configured to display an animated image appearing to interact with the three-dimensional object.

The embodiments described above may further comprise a light source disposed in the interior of the housing, the light source being configured to illuminate the first region when the drum is in the first alignment and to illuminate the second region when the drum is in the second alignment.

In at least some of the embodiments described above, the light source may be further configured to turn off while the drum is rotated between the first and second alignments.

Another embodiment includes an electro-mechanical toy, comprising: a housing with a transparent monitor; a multi-faced drum rotatably supported in the housing so that at least some faces of the drum may be hidden from view within the housing, while at least another face of the drum is visible through the transparent monitor; a sensor that senses a position of the drum relative to the transparent monitor; and electronics that generate an animated image on the transparent monitor as a function of the sensed position of the drum relative to the transparent monitor. A three-dimensional diorama may be formed as part of at least one face of the drum and the animated image appears to interact with the three-dimensional diorama.

Some embodiments may further comprise a base for supporting the housing on a surface, and the drum may rotates about an axis that is substantially parallel to a plane defined by the base when the housing is supported on a surface.

Some embodiments may further comprise a light inside the housing, wherein the electronics turn on the light to illuminate the another face of the drum, and turn off the light when the drum is rotated so that the rotation of the drum may be at least partially obscured.

Some embodiments may also include electronics causing an animated image or feature displayed on a screen to appear to dance in response to sound inputs. Sound inputs may be received by the playset by a circuit such as the one depicted in FIG. 11, and they may be received wirelessly or over a wire such as a standard headphone wire. Some sound circuits on embodiments according to the present disclosure may detect beat patterns in acoustic inputs While embodiments of a toy and methods of toy play have been particularly shown and described, many variations may be made therein. This disclosure may include one or more independent or interdependent inventions directed to various combinations of features, functions, elements and/or properties, one or more of which may be defined in the following claims. Other combinations and sub-combinations of features, functions, elements and/or properties may be claimed later in this or a related application. Such variations, whether they are directed to different combinations or directed to the same combinations, whether different, broader, narrower or equal in scope, are also regarded as included within the subject matter of the present disclosure. An appreciation of the availability or significance of claims not presently claimed may not be presently realized. Accordingly, the foregoing embodiments are illustrative, and no single feature or element, or combination thereof, is essential to all possible combinations that may be claimed in this or a later application. Each claim defines an invention disclosed in the foregoing disclosure, but any one claim does not necessarily encompass all features or combinations that may be claimed. Where the claims recite "a" or "a first" element or the equivalent thereof, such claims include one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated.

What is claimed is:

1. An electronic playset comprising:
a housing having a hollow interior;
a see-through monitor disposed on the housing;
a drum disposed in the hollow interior of the housing and including a first region and a second region, the drum being rotatable between a first alignment and a second alignment, wherein the first region is visible through the see-through monitor when the drum is in the first alignment and the second region is visible through the see-through monitor when the drum is in the second alignment, and
a transparent screen disposed on the see-through monitor and configured to display an animated image superimposed over the first region when the drum is in the first alignment and to display an animated image superimposed over the second region when the drum is in the second alignment;
wherein at least one of the first and second regions is a diorama with a three-dimensional object, and the transparent screen is further configured to display an animated image appearing to interact with the three-dimensional object.

2. The electronic playset of claim 1 further comprising a base for supporting the housing on a surface.

3. The electronic playset of claim 2 wherein the drum is rotatable about an axis that is substantially parallel to a plane defined by the base when the housing is supported on a surface.

4. The electronic playset of claim 1 further comprising a light source disposed in the interior of the housing, the light source being configured to illuminate the first region when the drum is in the first alignment and to illuminate the second region when the drum is in the second alignment.

5. The electronic playset of claim 4 wherein the light source is further configured to turn off while the drum is rotated between the first and second alignments.

6. An electro-mechanical toy, comprising:
a housing with a transparent monitor;
a multi-faced drum rotatably supported in the housing so that at least some faces of the drum may be hidden from view within the housing, while at least another face of the drum is visible through the transparent monitor;
a sensor that senses a position of the drum relative to the transparent monitor; and
electronics that generate an animated image on the transparent monitor as a function of the sensed position of the drum relative to the transparent monitor;
wherein a three-dimensional diorama is formed as part of at least one face of the drum and the animated image appears to interact with the three-dimensional diorama.

7. The toy of claim 6, further comprising a base for supporting the housing on a surface.

8. The toy of claim 7, wherein the drum rotates about an axis that is substantially parallel to a plane defined by the base when the housing is supported on a surface.

9. The toy of claim 6, further comprising a light inside the housing, wherein the electronics turn on the light to illuminate the another face of the drum, and turn off the light when the drum is rotated so that the rotation of the drum may be at least partially obscured.

10. The toy of claim 6 further wherein the electronics are configured to cause an animated image displayed on the transparent monitor to respond to acoustic input.

11. The claim of claim 10 wherein the animated image includes a character which appears to dance in response to the acoustic input.

12. An electronic game comprising:
a housing including a transparent screen;
a rotatable drum having a plurality of dioramas and mounted to the housing, the rotatable drum configured to move relative to the transparent screen; and
a switch configured to alter game play in response to alignment of the plurality of dioramas relative to the transparent screen;
wherein at least one of the plurality of dioramas includes a three-dimensional object, and the transparent screen is further configured to display an animated image appearing to interact with the three-dimensional object.

13. The electronic game of claim 12, wherein a selected diorama is visible when the selected diorama is aligned with the transparent screen.

14. The electronic game of claim 13, further comprising a plurality of user inputs configured to provide access to game features associated with the selected diorama.

15. The electronic game of claim 13, wherein the transparent screen is mounted adjacent one or more light sources.

16. An electronic game comprising:
a housing including a transparent screen;
a rotatable drum mounted to the housing and having a first diorama of an environment and a second diorama of an environment, the rotatable drum configured to rotate relative to the screen to align one of the first and second dioramas with the screen; and
a light mounted adjacent the screen and configured to illuminate the screen in response to alignment of one of the first and second dioramas with the screen;
wherein at least one of the first and second dioramas of an environment includes a three-dimensional object, and the transparent screen is further configured to display an animated image appearing to interact with the three-dimensional object.

17. The electronic game of claim 16, wherein the first and second dioramas are coupled to a shaft having an axis of rotation substantially parallel to a longitudinal axis of the screen.

* * * * *